Nov. 28, 1967 B. H. FRIEDMAN 3,354,814
SELECTIVE HEATING APPARATUS
Filed Oct. 23, 1965 2 Sheets-Sheet 1
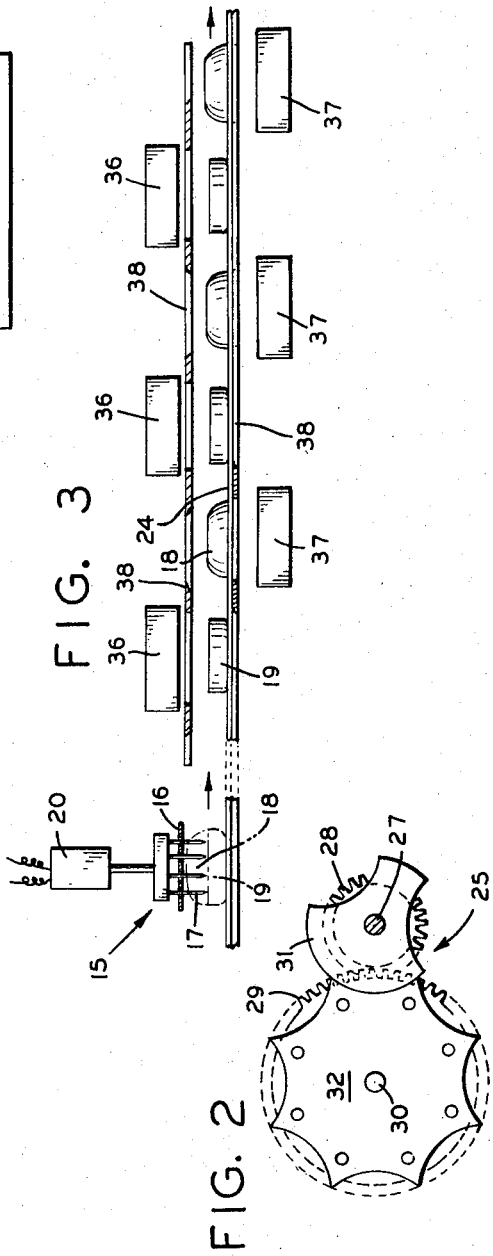
INVENTOR.
BERNARD H. FRIEDMAN
BY
Arthur J. Plantamura
ATTORNEY.

Nov. 28, 1967  B. H. FRIEDMAN  3,354,814
SELECTIVE HEATING APPARATUS
Filed Oct. 23, 1965  2 Sheets-Sheet 2

INVENTOR.
BERNARD H. FRIEDMAN
BY
ATTORNEY.

3,354,814
SELECTIVE HEATING APPARATUS
Bernard Harold Friedman, Yonkers, N.Y., assignor to American Machine & Foundry Company, a corporation of New Jersey
Filed Oct. 23, 1965, Ser. No. 503,867
3 Claims. (Cl. 99—353)

ABSTRACT OF THE DISCLOSURE

A machine for making toasted sandwiches comprising an elongate sandwich-roll conveyor, a step-type drive means coupled to said conveyor to advance and to halt said conveyor alternately for conveying and for loading said rolls alternately, a roll dispenser disposed adjacent to and coupled to said conveyor for loading multi-slice rolls in series onto said conveyor, and separating and toasting means coupled to said conveyor and to said step-type drive means to separate said rolls and to toast the sliced inner faces of said rolls for a substantially longer time than the outer faces of said roll.

---

This invention relates to a selective toasting apparatus and more particularly to an automatically functioning toasting apparatus which is operable continuously, or when required, and which, after toasting, delivers the individual pieces in proper orientation. To facilitate the description, the machine of the invention will be described in its function in connection with the processing of bread rolls, but it will be apparent to one skilled in the art that the apparatus may be usefully adapted to dispense other material of the kind, which it is desired to heat selectively and whose orientation, as the material is dispensed, it is desired to maintain.

In a more specific embodiment, the invention relates to an apparatus which may be combined with and form a part of a machine such as that described in the pending U.S. patent application of H. Udall et al., entitled "Food Preparing Apparatus and Method," Ser. No. 220,615, now Patent No. 3,266,442, capable of storing, automatically feeding, slicing, conveying and dispensing bread rolls fed thereto in conjunction with meat patties for subsequent assembly as sandwiches. Apparatus of this kind advantageously forms a part of an automated machine for preparing and dispensing articles of food ready for consumption by a customer. Moreover, because of its automatic features, apparatus of this kind is capable of use in an automated restaurant system of the kind, for example, which includes a centrally located attended control station where orders for food items are received directly, or by telephone or microphone, or other voice communication device, such as may be found at drive-in restaurants. An automated restaurant of this kind operates through electronic ordering and billing equipment and may include one or a variety of different food preparing machines which on demand cook and dispense food items which are then conveyed and assembled at a central location.

The device of the invention may be used as an independently operable unit or as a continuous production device. Even though one or more hours may elapse since a prior order has been dispensed, upon demand, it functions promptly and reliably to dispense a single or an indefinite number of consecutive sequences of items. It is also capable of processing a plurality of subsequent items without awaiting the completion of the processing of a prior item. The device is also characterized by its control features which are sequentially operable and perform a function from a single electrical impulse which may be received through other functions, and, in turn, may synchronously trigger later functions.

It is an object of the present invention to provide an on-demand arrangement for receiving and selectively heating items in a pre-determined order and dispensing the items in the oriented order in which they are processed.

It is another object of the invention to provide an automatically operable apparatus which automatically receives items from storage, aligns them in appropriate order, selectively heats the items and dispenses them in an oriented sequence.

It is still a further and more particular object of the invention to provide an automatic selective toasting unit which may readily be incorporated as a part of a sandwich-making machine which is controlled by electronic ordering and billing system so that upon remote command, the machine feeds the ingredients of the sandwich to be cooked and toasted and thereafter while maintaining orientation, in turn, delivers the processed sandwich parts to a central assembly station.

The above and other objects and features and advantages of the invention will be better understood from the following detailed description thereof when considered in conjunction with the accompanying drawing in which:

FIG. 1 is a plan view of the overall typical toasting arrangement, showing in addition to the toasting system, incidental apparatus used to enable use of the toasting scheme for the automatic processing of bread rolls, including dispensing of the line from storage, de-stacking and the delivery of the toasted product to a packaging or pick-up device.

FIG. 2 is a view taken along line 2—2 of FIG. 1, illustrating a suitable indexing drive mechanism to provide the desired intermittent drive.

FIG. 3 is a side elevational view taken substantially along line 3—3 of FIG. 1.

Figure 4:
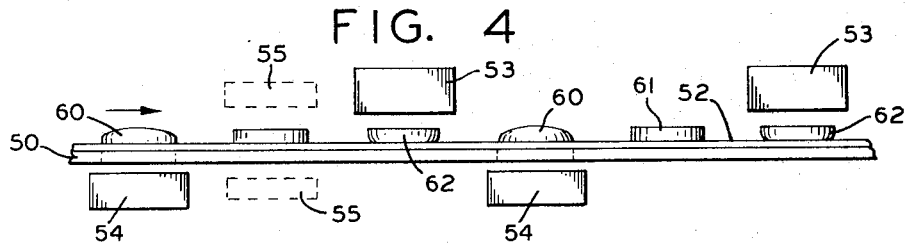
FIG. 4 is a side elevational view of an optional arrangement in which three slices are involved in the toasting cycle.

Referring in particular to the drawing, it is seen that the concept of the invention involves a scheme which selectively heats an oriented array of items as they are being processed. For purposes of specific illustration the invention is discussed in conjunction with a roll toasting arrangement, wherein the cut face of the roll is toasted while avoiding any substantial application of heat to the browned or uncut surface of the roll. It will be apparent that this concept may, however, be applied to the selective heating of other items. In general, as seen, the roll segments or portions are translated in a cyclic pattern, each cycle being either continuous with variable speed, or intermittent. For each cyclic pattern, toasting apparatus such as heaters, are oriented above and below the roll section in their respective position to toast the required surfaces. The roll sections translate on rail surfaces and are pushed by translating bars that are affixed to a recirculating belt or belts or chain. The motion of the system is so adjusted that the roll sections are toasted at the end of the cycle at which time there is a deliberate longer dwell period. It is true that toasting will occur as the rolls are translating and this amount of toasting is negligible in comparison to the toasting that takes place during the dwell period. The intensity of the heaters is adjustable and controllable, either electrically by varying the current input, or cyclic current input, such as would be achieved with an infinite pole switch, or physically adjustable by changing the distance between the radiating surface and the surface to be toasted, or by controlling the focussing aperture with the aid of shade or possibly focussing lenses. This apparatus can be used in a manual operation in which the roll sections are physically placed and removed after toasting, or can be used in conjunction with automatic apparatus to completely automate the process. A specific illustration of apparatus which is completely automated is the sandwich machine described in the earlier-mentioned application Ser. No. 220,615. In general, that apparatus includes a roll dispenser which dispenses a horizontally sliced roll whose parts are destacked or separated and the sections of which are fed in their proper cyclic orientation by a chain-driven conveyor. While the concept may process only a top and bottom section or slices of a roll which has been cut in half horizontally, an alternate pattern of toasting heaters and motion sequence may be used in which three or more sections are involved and used with an intermittent cyclic translatory motion. At the end of the toasting section it may be convenient also to place onto the bottom section of the roll additional food matter which is exposed to the heat of one or more heaters. The roll conveyor continues to index in a cyclic pattern and carry the loaded roll into and onto the assembly area. The assembly apparatus may be arranged to assemble and wrap the product and deliver it in a sealed container.

A roll dispenser 12, shown schematically, may take a variety of forms and may comprise a unit of the kind disclosed in H. Udall, et al., S.N. 220,615, now Patent No. 3,266,442. A unit of this kind feeds rolls in their unsliced condition into a slicer 13, which cuts the roll horizontally. A suitable slicer having reciprocating blades is described in the U.S. patent application of D. Holden, S.N. 273,065, now Patent No. 3,236,128. This unit, after cutting the rolls conveys them into a pick-up position where a pivotable transfer arm 14 pushes the whole of the sliced roll onto the conveyor 11.

As the sliced roll is deposited on the conveyor, a destacking apparatus 15 separates the upper slice 18 from the bottom 19. Any suitable de-stacking device 15 may be employed such as retractable pins 17 extending through a stripper plate 16 activated by a suitable double action solenoid 20. In operation, the de-stacking pins 17 are lowered and impale the top slice and hold it while the lower slice is conveyed, thus preventing it from translatory motion until the lower slice has been moved out from underneath it. The roll conveyor indexes one position forward, the de-stacking pins are retracted and the top slice is released. Alternately, the de-stacker device disclosed in the earlier-mentioned application, S.N. 220,615 may be employed.

Once the two slices of roll are thus separated, the parts 18 and 19 are properly oriented in a cyclic pattern on the roll conveyor 11. The roll conveyor 11 consists of a pair of spaced endless chains provided with pusher bars 23, connecting the two in a fashion so as to provide a compartment to accommodate individual slices. The conveyor chain drive consists of a sprocket wheel assembly 21, which engages both chains simultaneously and rotates with a step-type or an intermittent motion with various speed and dwell periods. At the delivery end of the chain conveyor is a pair of idler sprockets (not shown) that maintain the chain drive in its proper orientation and tension. The chains 22 carrying pusher bars 23 are guided over rails 24 by engagement of the chain in driven sprocket 21. The rails 24, two of which are shown, although one or more may be used, support the roll as it is pushed along conveyor 11. The rails 24 are preferably narrow (and may also comprise wires) to prevent blocking of any more than a minimum of the surface to be toasted from the underside. The drive for the conveyor 11 may take any suitable form, such as a Geneva type mechanism. The assembly 25 is of the segmented gear type. This arrangement offers complete flexibility over the driven and dwell cycles. A motor 26 powered through a source of electricity at 33 rotates drive shaft 27 onto which the segmented gear assembly is attached. Assembly 25 comprises a segmented gear 28 and a segmented orienting cam 31, which is affixed to the segmented gear. The driven gear assembly comprises a continuous gear 29 to which is affixed a driven orienting cam 32. The driven gear assembly is connected to the sprocket drive shaft 30, which, in turn, is connected to the drive sprockets 21. The operation of the conveyor 11 through the segmented gear drive unit 25 is typically as follows: as the segmented drive gear rotates, it has one of two effects on gear 29; it will either rotate if a toothed portion of gear 28 meshes with gear 29, or it will maintain the driven gear stationary as a lobe of the cam 31 rotates within one of the scalloped recesses of cam 32. Movement of the gear 28 and cam 31 is continuous. Only when the gears mesh, however, is the driven gear 29 rotated. At the point of disengagement of the gears the orienting cams engage and slide, one relative to the other, the driven cam being stationary, hence preventing rotation of the driven gear. It is thus seen that this arrangement provides the dwell period at the point of next engagement of the segmented gear. The orienting cams will disengage and permit rotation of the driven gear. The segmented cam automatically positions the teeth for proper engagement and meshing. Any output, either continuous or indexing, can be accomplished through variable combinations of segmentation of the driving gear and by different gear diameter ratios and driving speed motor.

The heating apparatus which provides the selective heating comprises upper heating elements 36 and lower heating elements 37. These heaters may be of the type which are left on continuously or switched on only when needed. The orientation is consistent with the cyclic pattern of the separated slices 18 and 19 of the roll, i.e. with upper heaters 36 toasting the lower part, or upward-facing cut portion, of the roll 19 and the lower heaters 37 toasting the bottom, or downward-facing, cut surface of the top section 18 of the roll. The heaters are both adjustable in elevation and for toasting intensity, either electrically, if they are electrical heaters, or by some other controlling means, depending upon the nature of the heating unit. Moreover, gas toasters may also be employed if so desired, although electrical heaters, e.g., quartz units, are preferably used.

When gas is used, the intensity may be controlled by varying the fuel input. Shades 38 as shown in FIG. 3 may optionally be employed to localize the toasting effects and may be fabricated from a continuous strip in which openings of the proper configuration and position have been made.

The assembly area 41 comprises an arrangement which appropriately dispenses the product carried by conveyor 11. For example, as described in the above-mentioned application of Udall et al., S.N. 220,615, now Patent No. 3,266,442, the various parts of the product are assembled in order by stacking and thereafter the stacked unit is wrapped as in assembly recess 42 and the packaged product is dispensed.

It is seen from the foregoing that the apparatus of the invention provides a mechanism for selectively heating a product. The pushers 23 convey their respective parts of the product in an intermittent, but cyclic, fashion of the rails 24, and into the heating or toasting zone. As the conveyor 11 indexes forward, the product, e.g., sliced rolls, is brought into the radiation zone. The dwell period has been adjusted so that the upward-facing cut surface of the bottom slice 19 passes and pauses under a top heater 36 and the downward-facing cut surface of the top slice 18 pauses above the bottom heater 37. During the comparatively long dwell periods it may be arranged so that either partial or complete toasting may take place. In the case of partial toasting, the cyclic pattern of translatory motion will bring the roll sections under a repeated toasting arrangement. The number of heating units depends upon the time cycle, the heat intensity and the length of the area to be heated. The shade 38 may be used to localize the toasting effects, thus avoiding unnecessary scattered heating.

An alternate arrangement which is identical in method with the exception that there are three sections to be toasted is shown by reference to FIG. 4. As seen, a top slice 60, an intermediate slice 61, which may be the middle slice of a doubly cut roll, or a separately introduced slice and a bottom slice 62. The several slices or items are suitably position oriented in sequence on the conveyor. For example, in order to place an intermediate slice in orientation between a roll slice in two, it would be arranged to hold the top slice, as by the de-stacking unit, for an additional index before dropping it onto the conveyor. The middle slice 61 could be appropriately inserted as by an additional piece of apparatus which would be properly timed for the purpose or manually. The heating section of the arrangement of FIG. 4 which comprises a conveyor 50 and rails 52 is similar in construction to the one described in connection with FIGS. 1 and 3. It is understood that the drive mechanism in this embodiment may also be of the segmented gear construction. The upper and lower heaters are again arranged in a cyclic pattern so as to effect the intended result, i.e., the upper heater 53 toasting the upward-facing cut surface of the bottom slice 62 of the roll and the lower heater 54 toasting the downward-facing cut surface of the top slice 60 of the roll. Additional heaters 55, shown in phantom, may be placed either above and below or on just one side to toast both sides not just one side of the middle section, if so desired. Here again, suitable screens or shades (not shown) similar to those shown at 38 in FIGS. 1 and 3 may be employed for the same purposes as described previously.

Figure 5:
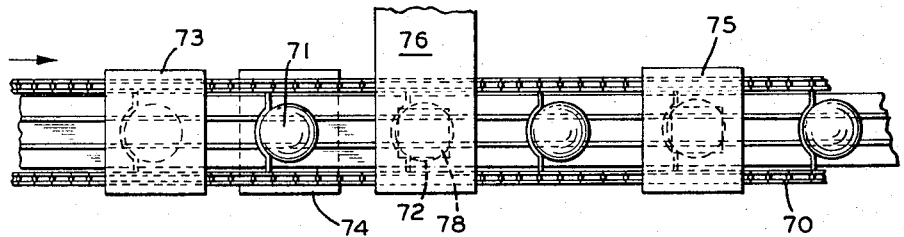
FIG. 5 is a plan view of an alternate arrangement which incorporates a cheese dispensing device.
Figure 6:
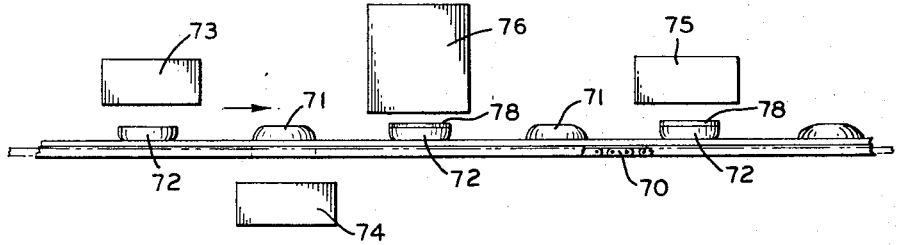
FIG. 6 is a side elevational view of the alternate illustration depicted in FIG. 5.

Referring to FIGS. 5 and 6, an arrangement of the heating unit of the invention is depicted in conjunction with an additional piece of equipment which may be either manually operated or automatically. The additional apparatus may deposit an item such as cheese, which it is desired to subject to heat after it has been placed on the top of one of the sections of the segmented roll. Essentially, the difference in this unit over that of FIG. 1 involves an additional set of upper heaters to accomplish the melting of the added goods and its function will be described in connection with a cheese-depositing apparatus 76, such as described in the above-mentioned Udall et al. application, S.N. 220,615, now Patent No. 3,266,442, as shown a depositing apparatus or arm 76, deposits a slice of cheese 78 onto the bottom slice 72 of the roll 72 carried by conveyor 70. Toasting of the sectioned roll has preferably already been accomplished, at least in part, prior to the cheese deposit zone. As described hereinbefore, an upper heater 73 toasts the upward-facing cut face of bottom slice 72 and a lower heater 74 toasts the downward-facing cut surface of top slice 71. An upper heater 75, or multiple heaters, properly spaced over the conveyor 70, is positioned so that the deposited slice of cheese 78 will be melted. These heaters are adjustable both in elevation and separately adjustable by means (not shown) for intensity. It will be apparent that selective heating of an oriented sequence, including a plurality of two or more items is provided wherein certain items of the sequence are heated with varying intensities, while other items of the sequence are essentially excluded from substantial heating.

Various modifications may be made in the foregoing described concept for selective heating of an ordered sequence without departing from the invention herein provided.

I claim:
1. An apparatus for heating sliced food items conveyed in an oriented sequence comprising:
   a conveyor arranged to transport sliced food items having sliced inner faces and unsliced outer faces,
   a separating mechanism to arrange the slices on the conveyor in series with the sliced inner faces alternately facing up and down,
   a plurality of longitudinally-spaced heating elements disposed above and below said conveyor arranged to simultaneously heat a plurality of said faces of said items transported on said conveyor,
   a step-type drive means arranged to move said conveyor in predetermined sequence of differing intervals, so that the sliced inner faces of said items on said conveyor pause near said heating element and are preferentially subjected to relatively greater amount of heat therefrom than the unsliced outer faces of said items, and
   an automatic bread roll dispenser slicer and a de-stacker, wherein rolls individually fed to a slicer are separated and positioned sequentally on said conveyor, while maintaining their orientation, and wherein said de-stacker comprises a piston with a plurality of pins, a solenoid coupled to said piston, and a stripper plate engaging said piston.

2. In a machine for making toasted sandwiches including:
   an elongate sandwich-roll conveyor;
   a step-type drive means coupled to said conveyor to advance and to halt said conveyor alternately;
   a roll dispenser disposed adjacent to said conveyor for loading multi-slice rolls in series onto said conveyor;
   the combination with said conveyor and drive means of separating and toasting means cooperating with said conveyor and said step-type drive means;
   said separating means being disposed adjacent to said conveyor and to said roll dispenser for separating said rolls into at least upper and lower slices and for placing said upper slices face down and following said lower slices respectively on said conveyor; and
   said toasting means being disposed adjacent to said separating means and comprising at least a pair of upper and lower heating elements respectively disposed above and below said conveyor, in which said upper heating element is disposed at a longitudinal distance from said separating means and said upper and lower heating elements have a longitudinal spacing therebetween, and wherein
   said longitudinal spacing between said heating elements is substantially equal to the length of one advance of said conveyor and said longitudinal distance from said separating means to said upper heating element is substantially equal to a multiple of said spacing length.

3. In a machine for making toasted sandwiches including:
   an elongate sandwich-roll conveyor;
   a step-type drive means coupled to said conveyor to advance and to halt said conveyor alternately;
   a roll dispenser disposed adjacent to said conveyor for loading multi-slice rolls in series onto said conveyor;
   the combination with said conveyor and drive means of separating and toasting means cooperating with said conveyor and said step-type drive means;
   said separating means being disposed adjacent to said conveyor and to said roll dispenser for separating said rolls into at least upper and lower slices and for placing said upper slices face down and following said lower slices respectively on said conveyor; and
   said toasting means being disposed adjacent to said separating means and comprising at least a pair of upper and lower heating elements respectively disposed above and below said conveyor, in which
   said separating means comprises;
   a piston with a plurality of pins,
   a solenoid coupled to said piston for raising and lowering said piston, and
   a stripper member engaging said piston for disengaging roll slices from said piston.

(References on following page)

References Cited

UNITED STATES PATENTS

| | | | |
|---|---|---|---|
| 3,208,605 | 9/1965 | Burke | 214—8.5 |
| 1,820,745 | 8/1931 | Kater | 74—435 |
| 2,146,427 | 2/1939 | Hawkins | 219—388 |
| 2,337,117 | 12/1943 | Lloyd | 107—1.6 |
| 2,565,174 | 8/1951 | Fredenhagen et al. | 99—386 |
| 2,762,320 | 9/1956 | Ireland. | |
| 2,797,589 | 7/1957 | Chaueneaud | 74—435 X |
| 2,820,131 | 1/1958 | Kodama | 219—388 |
| 3,019,744 | 2/1962 | Carvel | 99—423 X |
| 3,262,383 | 7/1966 | Sturman | 99—386 |
| 3,266,442 | 8/1966 | Udall et al. | 107—1 |

BILLY J. WILHITE, *Primary Examiner.*